Sept. 12, 1944. A. F. HASBROOK 2,357,822
MEASURING INSTRUMENT
Filed June 2, 1941
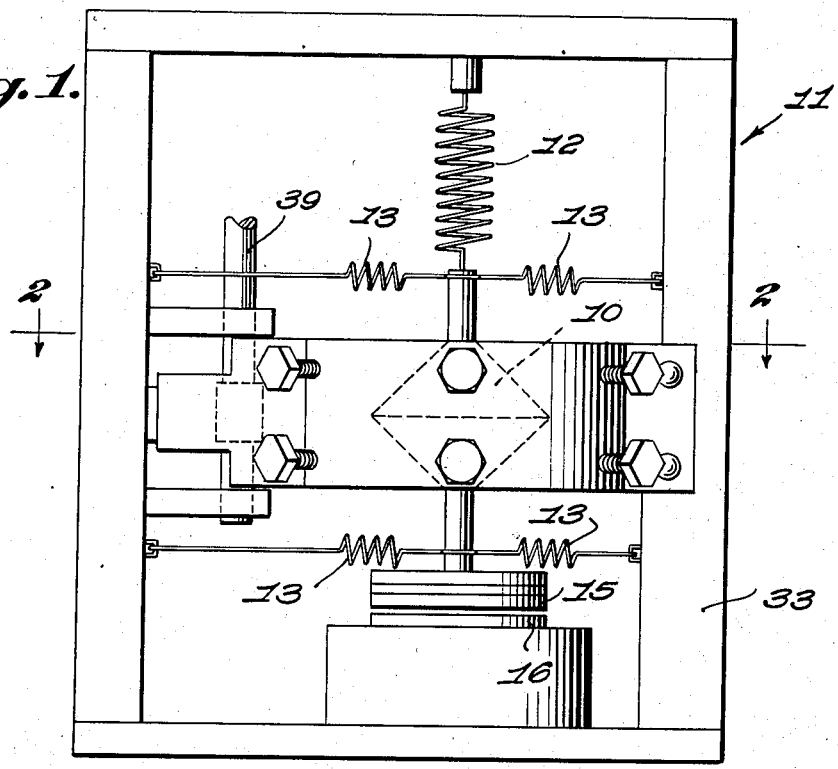
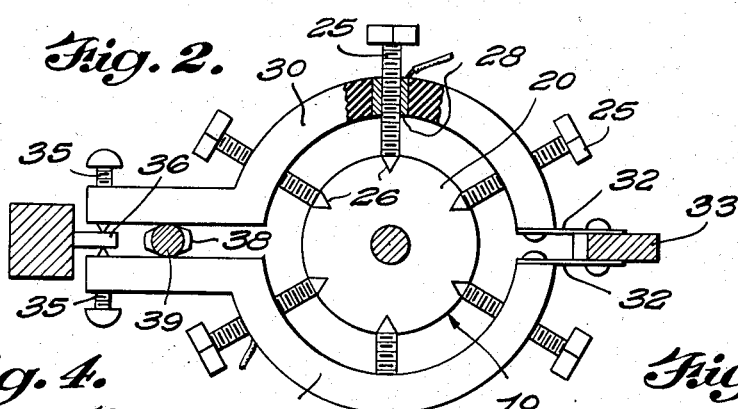
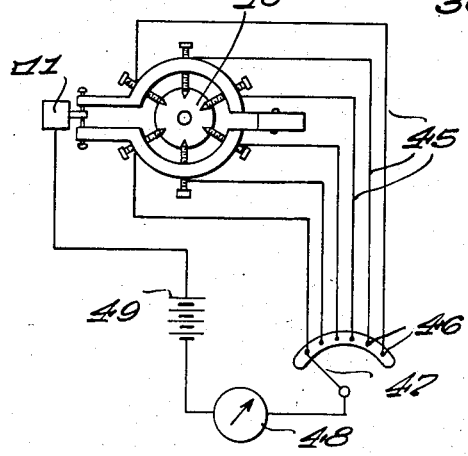
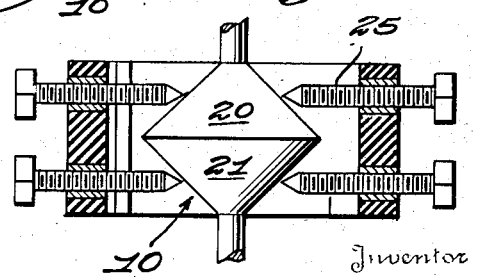
Inventor
Arthur F. Hasbrook
By Watson, Cole, Grindle & Watson
Attorney Patented Sept. 12, 1944

2,357,822

UNITED STATES PATENT OFFICE 2,357,822

MEASURING INSTRUMENT

Arthur F. Hasbrook, San Antonio, Tex., assignor to Olive S. Petty, San Antonio, Tex.

Application June 2, 1941, Serial No. 396,339

12 Claims. (Cl. 265—1.4)

This invention relates to improvements in force measuring instruments and the like, in which a member is yieldingly mounted for slight displacement in response to applied force. It is the principal object of the invention to restrict unwanted and undesirable displacement of such members, for example such displacement as may occur in the course of transporting the instrument.

In delicate measuring instruments, for example gravimeters such as are commonly employed for the measurement of slight variations in the force of gravity, it is essential that precautions be taken to prevent or limit displacement of the conventional movable mass when the instrument is not in use, so as to avoid strain and distortion of the instrument parts. It is common practice to clamp such movable members so as to prevent any displacement thereof, and certain features of my invention are applicable to such an arrangement. I prefer, however, to permit the movable member some freedom of movement within certain limits, even when the instrument is not in use. Thus it can be shown that the rigid clamping of movable masses and the like is apt to impose on the suspending spring or other delicate parts of the instrument a force which causes hysteresis and drift in the spring, or distortion of such other parts.

It is therefore an object of the instant invention to restrict unwanted movement of the yieldingly suspended member of a measuring instrument with the application of a minimum of force, preferably by limiting such displacement to a predetermined but appreciable extent, rather than by preventing displacement altogether.

A more specific object of the invention is the provision of means, in association with a yieldingly suspended member, coacting with the member in such a way as to limit or prevent either lateral or vertical displacement thereof in excess of a predetermined minimum, the limiting means being adjustable to afford only slight clearance with the mass, and being readily retractible from the member to permit free displacement of the latter when the instrument is in use. Electrical indicating means is preferably associated with the displacement limiting means to facilitate adjustment of the latter so as to afford the desired slight clearance.

Further objects and features of the invention will be apparent from the following description, taken in connection with the accompanying drawing, in which:

Figure 1 is an elevational view illustrating the essential elements of a measuring instrument to which the invention has been applied;

Figure 2 is a horizontal sectional view taken substantially on the line 2—2 of Figure 1;

Figure 3 is a fragmentary elevational view showing the suspended member of the instrument illustrated in Figure 1 in association with the displacement restricting elements; and Figure 4 is a diagrammatic view illustrating the application to the device shown in Figures 1 to 3 of electrical indicating means to facilitate adjustment of the elements.

In order to facilitate an understanding of the invention, reference will be made to the several embodiments thereof illustrated in the accompanying drawing and specific language will be employed. It will nevertheless be understood that various further modifications of the devices illustrated herein, such as would fall within the province of those skilled in the art to construct, are contemplated as part of the present invention.

I have chosen to represent the invention in its application to a gravimeter including a mass 10 which is yieldingly suspended from the frame indicated generally at 11 by a coil spring 12. Horizontal stability of the mass is achieved by the use of a plurality of smaller coil springs 13 acting between the frame 11 and the upper and lower portions of the mass 10. Carried by the lower portion of the mass, and insulated therefrom, is the movable plate 15 of a condenser, the fixed plate 16 of which is carried by and insulated from the frame. As will be understood by those skilled in the art, slight variations in the force of gravity are translated by the structure just described into corresponding variations in the spacing between the condenser plates 15 and 16, and when these plates are incorporated in a suitable electrical circuit, for example such as is shown in the application of Olive S. Petty, Serial No. 366,495, filed November 20, 1940, variation in the capacity of the condenser 15, 16 may be immediately appreciated and accurately indicated or recorded.

In order that I may conveniently limit both lateral and vertical displacement of the mass 10, I prefer to employ a mass which is provided with one or more surfaces inclined with respect to the vertical, these surfaces cooperating with restricting or restraining elements to prevent or limit movement of the mass. Thus in the simple application of the invention illustrated herein, the mass is formed to provide oppositely directed conical surfaces 20 and 21. Positioned to coact with these conical surfaces, and spaced at convenient intervals about the mass 10, are a plurality of adjustable elements 25, in the form of threaded bolts having pointed ends 26 in juxtaposed relation with the conical surfaces 20 and 21. The elements 25 may be threaded in bushings 28 received in spaced apertures in arms 30, the latter being mounted for displacement toward and away from the member 10. Thus each of the arms 30 may be mounted on a resilient plate 32 secured to an adjacent element 33 of the frame 11. The plates 32 are normally tensioned to urge the arms 30 toward each other, such movement being limited by adjustable elements 35 threaded in the free end of each arm and engaging a frame carried abutment 36. Cam surfaces 38 formed on a rotatable rod 39 are positioned intermediate the arms 30, so that rotation of the rod 39 forces the arms outwardly against the tension of the plates 32, whereby the elements 25 may readily be withdrawn from juxtaposed relation with the conical surfaces 20 and 21 of the member 10.

It will be appreciated that with the parts in the position in which they are shown in Figure 2, the elements 25 may be adjusted so that the points 26 thereof are contiguous to the surfaces 20 and 21, but slightly spaced therefrom, so that displacement of the member 10 in any direction in excess of a predetermined minimum displacement is prevented. By rotation of the shaft 39, the elements 25 can be immediately withdrawn from the member 10 to an extent affording ample freedom of movement of the member 10 when the instrument is in use.

While I may adjust the members 25 into engagement with the surfaces 20 and 21 of the member 10, so as to prevent any displacement whatever of the latter, I prefer to so adjust the elements 25 as to afford a very slight clearance, as hereinbefore stated. In order that this clearance may readily be established, I may employ electrical indicating means of the type disclosed in Figure 4.

Thus the arms 30 may be formed of insulating material and the bushings 28 and the elements 25 may be of conducting material, such as metal, or some similar precautions may be taken to insulate the several elements 25 from each other. A conductor 45 may then be connected between each bushing 28 and each of a series of switch points 46 associated with a movable contact element 47. The element 47 may be connected through an indicating device 48, such as an ammeter, and a source of voltage 49 to the frame 11 and thence to the movable member 10 through the supporting spring 12 for the latter. It will be appreciated that it is only necessary, in order to determine whether any given element 25 is in contact with the member 10, to select the appropriate switch point 46 by means of the contact element 47. In the event the element 25 in question engages the member 10, the instrument 48 will respond. The element 25 may then be adjusted slightly until the circuit is open. When the elements 25 are each spaced very slightly from the member 10, displacement of the latter will be negligible and insufficient to damage the instrument. At the same time, the application of force to the member 10, with resulting distortion of the delicate parts of the instrument is definitely avoided.

Alternatively, the elements 25 may be adjusted so as to lightly engage the member 10 to prevent movement of the latter; slight clearance may then be provided, if desired, by adjustment of the elements 35 which define the limiting position of arms 30.

Further methods of adjustment and use of the device disclosed herein will readily occur to those skilled in the art to which the invention relates, and such modification of the structural elements herein illustrated, within the limits defined by the appended claims, is contemplated as part of the invention.

Having thus described the invention, what is claimed as new and desired to be secured by Letters Patent is:

1. In a force responsive instrument, the combination with a yieldingly suspended member, of means for restricting lateral and vertical displacement of said member during transportation of said instrument, said means including a plurality of elements mounted for adjustment toward and away from said member, said member having a plurality of surfaces inclined in opposite directions at acute angles to the vertical and so positioned with respect to said elements as to engage the latter when said member is subjected to displacement in excess of a predetermined minimum, each of said elements being positioned for engagement with one only of said surfaces.

2. In a force responsive instrument, the combination with a yieldingly suspended member, of means for restricting lateral and vertical displacement of said member during transportation of said instrument, said means including a plurality of elements mounted for adjustment toward and away from said member, said member having oppositely directed, generally conical surfaces so positioned with respect to said elements as to engage the latter when said member is subjected to displacement in any direction in excess of a predetermined minimum, each of said elements being positioned for engagement with one only of said surfaces.

3. In a force responsive instrument, the combination with a yieldingly suspended mass presenting oppositely directed, generally conical surfaces, of means including a plurality of elements supported at spaced points about said mass for adjustment toward and away from said surfaces, whereby said elements may be adjusted into contiguous relation with said surfaces to prevent unwanted displacement of said mass in either a lateral or vertical direction, each of said elements being positioned for engagement with one only of said surfaces.

4. In a force responsive instrument, the combination with a yieldingly suspended member, of means for restricting displacement of said member during transportation of said instrument, said means including a plurality of elements mounted for independent adjustment toward and away from said member, means in which said elements are adjustably mounted, said last named means being mounted for displacement between two positions, in one of which said elements are disposed in closely adjacent and spaced relation to said member to restrict displacement of the latter, means for effecting such displacement of said last named means, and an adjustable device for limiting the extent of displacement of said last named means in a direction to effect such restriction.

5. In a force responsive instrument, the combination with a yieldingly suspended member, of means for restricting lateral and vertical displacement of said member during transportation of said instrument, said means including a plurality of elements mounted for adjustment toward and away from said member, means in which said elements are adjustably mounted, said last named means being mounted for displacement between two positions, in one of which said elements are disposed in closely adjacent and spaced relation to said member to restrict displacement of the latter, means for effecting such displacement of said last named means, and an adjustable device for limiting the extent of displacement of said last named means in a direction to effect such restriction, said member being provided with oppositely inclined surfaces for coaction with said elements.

6. In a force responsive instrument, the combination with a yieldingly suspended member, of means for restricting lateral and vertical displacement of said member during transportation of said instrument, said means including a plurality of elements mounted for adjustment toward and away from said member, said member having a surface inclined at an acute angle to the vertical for engagement with said elements, and electrical indicating means associated with said elements to afford an indication on the occurrence of engagement of said surface by said elements, whereby adjustment of said elements into positions affording only slight mechanical clearance with said surface is facilitated.

7. In a gravity meter, the combination with a vertically sprung mass supported for vertical displacement in response to gravity, of elements adjustable radially of said mass for restricting lateral displacement of the latter, and an electrical indicating circuit responsive to contact between said devices and said mass, said circuit including means for indicating completion of the circuit, whereby said devices may readily be adjusted to positions affording only slight mechanical clearance with said mass, said mass having oppositely inclined surfaces for engagement with said elements on the occurrence of either lateral or vertical displacement of said mass in excess of a predetermined minimum.

8. In a force responsive instrument, the combination with a yieldingly suspended mass presenting oppositely directed, generally conical surfaces, of means including a plurality of elements supported at spaced points about said mass for adjustment toward and away from said surfaces, whereby said elements may be adjusted into contiguous relation with said surfaces to prevent unwanted displacement of said mass in either a lateral or vertical direction, each of said elements being positioned for engagement with one only of said surfaces, and electrical indicating means responsive to contact between said elements and said surfaces to facilitate adjustment of said elements into contiguous but spaced relation with said surfaces.

9. In a force responsive instrument the combination with a yieldingly suspended member, of means for restricting displacement of said member during transportation of said instrument, said means including a plurality of elements mounted for independent adjustment toward and away from said member, means in which said elements are adjustably mounted, said last named means being mounted for displacement between two positions, in one of which said elements are disposed in closely adjacent and spaced relation to said member to restrict displacement of the latter, means for effecting such displacement of said last named means, and an adjustable device for limiting the extent of displacement of said last named means in a direction to effect such restriction, said member having oppositely disposed conical surfaces for engagement by said elements on the occurrence of displacement of said member, either laterally or vertically, in excess of a predetermined minimum.

10. In a force responsive instrument, the combination with a yieldingly suspended member, of means for restricting displacement of said member during transportation of said instrument, said means comprising arms, one supported at each side of said member, for movement toward and away from said member, means for moving said arms to and from said member, adjustable elements carried in said arms for independent adjustment therein toward and away from said member, and separate means limiting movement of said arms toward said member to positions affording only slight mechanical clearance between said elements and said member.

11. In a force responsive instrument, the combination with a yieldingly suspended member, of means for restricting displacement of said member during transportation of said instrument, said means comprising arms, one supported at each side of said member, for movement toward and away from said member, means for moving said arms to and from said member, adjustable elements carried in said arms for independent adjustment therein toward and away from said member, separate means limiting movement of said arms toward said member to positions affording only slight mechanical clearance between said elements and said member, and means associated with said member and affording oppositely directed, generally conical surfaces for engagement by said elements.

12. In a force responsive instrument, the combination with a yieldingly suspended member, of means for restricting displacement of said member during transportation of said instrument, said means comprising arms, one supported at each side of said member, for movement toward and away from said member, means for moving said arms to and from said member, adjustable elements carried in said arms for independent adjustment therein toward and away from said member, and separate means limiting movement of said arms toward said member to positions affording only slight mechanical clearance between said elements and said member, said last named means being adjustable to vary the extent of such movement of the arms.

ARTHUR F. HASBROOK.